Figure 1:
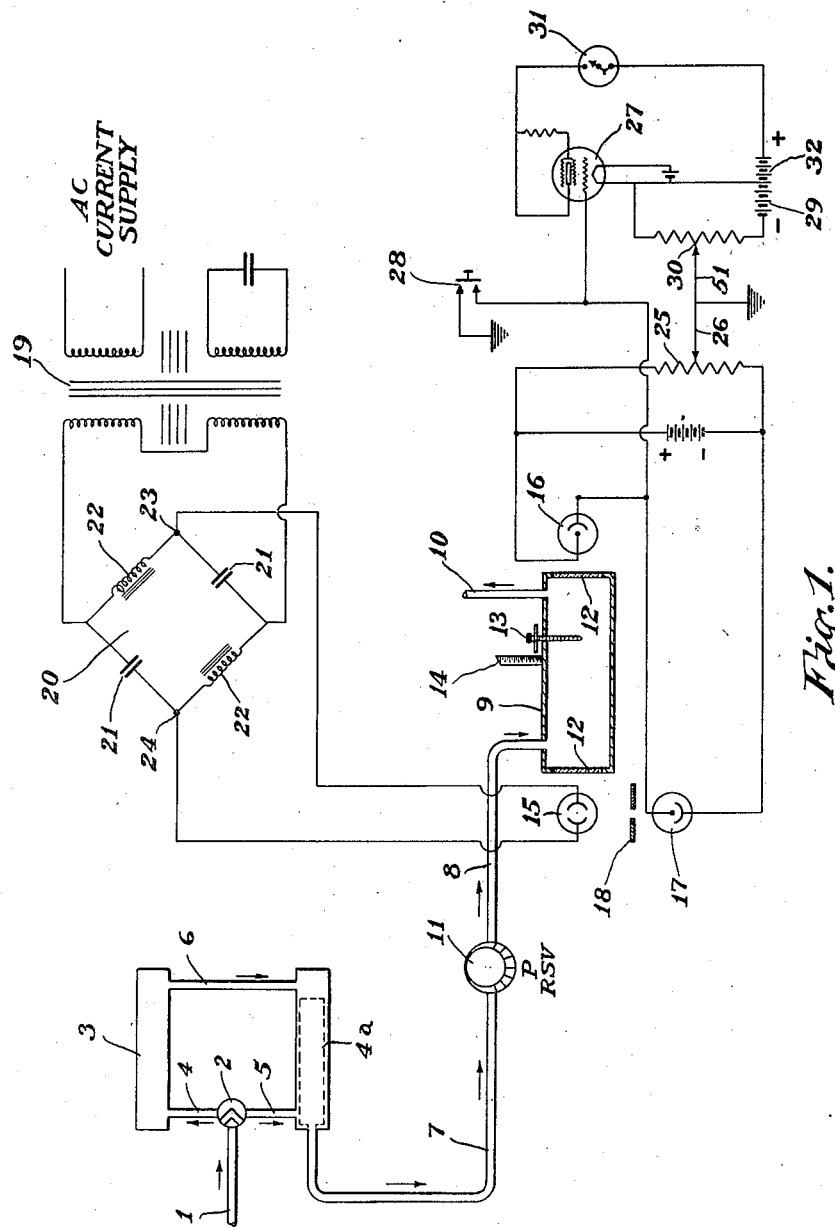

INVENTOR.
VICTOR F. HANSON
BY Theodore T. Budrow
ATTORNEY.

June 16, 1942.   V. F. HANSON   2,286,985
ANALYSIS OF GAS MIXTURES
Filed July 4, 1939   2 Sheets-Sheet 2

INVENTOR.
VICTOR F. HANSON
BY Ronald J Stone
ATTORNEY.

Patented June 16, 1942

2,286,985

UNITED STATES PATENT OFFICE 2,286,985

ANALYSIS OF GAS MIXTURES

Victor F. Hanson, Niagara Falls, N. Y., assignor to E. I. du Pont de Nemours & Company, Wilmington, Del., a corporation of Delaware Application July 4, 1939, Serial No. 282,794

3 Claims. (Cl. 88—14)

This invention relates to the analysis of chemical substances in gas-phase mixtures and more particularly to devices for detecting and determining the concentration of a substance in the gas phase in a gaseous mixture.

Various devices and methods are known which are adapted to detect the presence of gases or vapors in gaseous mixtures, for example to detect such vapors in air. Most of these depend on observable chemical reactions, e. g. lead acetate paper to detect hydrogen sulfide. In some cases the tests depend on electrical effects, as change in resistance in an electrical conductor. While a number of such tests are highly sensitive to small traces of the vapor to be detected, few are well adapted to accurately determine the actual concentration of a vapor in air or other gaseous mixture over a wide range of concentrations. In most cases the method is adapted only for a specific chemical substance and has a limited application.

Also, for many chemical substances, no satisfactory method is available for the detection and determination of their vapor concentrations in gaseous mixtures. This is true, for example of chlorinated solvents such as trichlorethylene and perchlorethylene. Such chlorinated solvents are widely used for metal degreasing, dry cleaning, extraction and the like in large commercial installations. To guard against excessive solvent loss and for hygienic reasons it is desirable to test the air at the site of such solvent operations to detect and determine the amount of solvent escaping from the mechanical system. Likewise, it is desirable to have means for testing air to determine the presence of vapors of various other substances which may be toxic or costly, in a variety of industrial operations. In most such cases it is highly desirable to be able to accurately determine the actual concentration of the vapor, even when it may be present in exceedingly small amounts.

An object of the present invention is to provide an improved apparatus for detecting small amounts of a chemical substance in vapor form in a gaseous mixture and for measuring the concentration of such vapor with a high degree of accuracy. Another object is to provide such an apparatus which is adapted for the detection of a wide variety of different chemical substances. Other objects will be apparent from the following description of my invention.

These objects are attained in accordance with my invention by utilizing a photosensitive electrical device to measure the amount of light of a certain wave length which is absorbed by the vapor the concentration of which is to be determined, the light used having a wave length corresponding to at least a portion of the absorption spectrum of the vapor. For example, to measure the concentration of trichlorethylene vapor in air, I may utilize a light from a mercury arc lamp which has a wave length lying within the absorption spectrum of trichlorethylene. This light is passed through a layer of measured thickness of the trichlorethylene-air mixture and onto a photosensitive electrical device, such as a phototube and the electric current flowing through the photosensitive device is measured. This is compared with the amount of current flowing through the photosensitive device when exposed to the same light passing through air which is free from trichlorethylene. The difference shown corresponds to the concentration of the trichlorethylene in the air, since the amount of light absorbed by the relatively opaque trichlorethylene is dependent upon its concentration.

In order to measure the electric current flowing through the photosensitive device, I may use suitable conventional electrical circuits and instruments, the selection of which depends upon the photoelectric device utilized. For example, when using a phototube, I may use a conventional electrometer circuit having a triode or tetrode thermionic tube. The phototube circuit is connected to the cathode and grid of the thermionic tube and the current measurement is made by means of an ammeter or equivalent instrument in the plate circuit of the thermionic tube.

When an electrical instrument is used to measure the current flowing through the photosensitive device, such instrument may be calibrated, to read directly the vapor concentration in the gas tested, or the reading may be converted to concentration by reference to a chart or curve made in calibrating the apparatus. The calibration may readily be done by applying the apparatus to the examination of gas mixtures of known composition and plotting calibration curves, according to known principles of calibration.

In utilizing my invention, I have found that it is not always satisfactory to depend on the reading of an electrical measuring instrument to determine the vapor concentrations, especially to determine concentrations of a low order of magnitude or to detect small traces of a vapor in a gaseous body. To increase the sensitivity and accuracy of my apparatus in this respect, I provide, in conjunction with an electrical measuring instrument such as an ammeter or galvanometer, a mechanical means for varying the light passing to the photosensitive device and means, such as a micrometer screw or its equivalent, for accurately measuring the movement of the mechanical light varying means. In the simplest and generally preferred arrangement, I mount a calibrated micrometer screw in such fashion that rotation of the screw moves the screw in or out of the beam of light passing to the photosensitive device, so as to intercept a variable fraction of the light. Movement of the screw then will cause a corresponding movement of the pointer of the ammeter, greatly magnified. Hence by turning the screw to return the ammeter pointer to a predetermined point, a highly accurate reading may be taken from a suitable linear scale associated with the screw.

Figure 2:
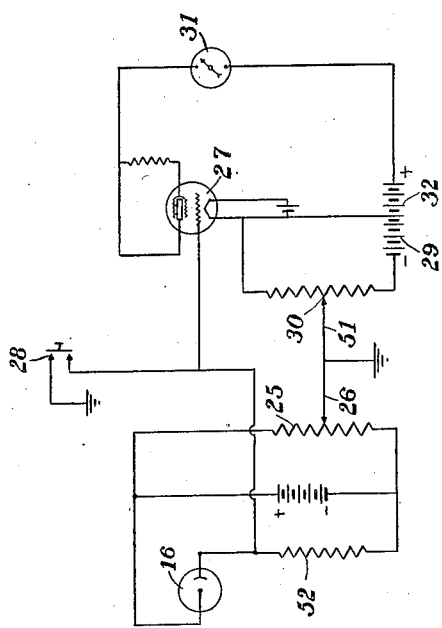

In the appended drawings Figure 1 is a diagrammatic representation of one form of apparatus embodying my invention, this embodiment having a pair of phototubes connected with a variable resistance in a Wheatstone bridge type of electrical circuit. Figure 2 is a similar representation of an alternative type of phototube circuit employing only one phototube.

In the apparatus, as illustrated by Figure 1 of the drawings, tube 1 is an inlet for air or gas to be tested. Tube 1 is connected by way of a three-way valve 2 on one hand to absorption tube 3 by way of tube 4 and on the other hand to a filter 4a by way of tube 5. Absorption tube 3 is filled with a material capable of absorbing the gaseous constituents to be tested; for example, for testing trichlorethylene vapor I use activated charcoal or other suitable absorbent for trichlorethylene in tube 3. Tube 6 connects tube 3 with filter 4a so that gas drawn through absorption tube 3 may pass through the filter 4a. Gas leaving filter 4a passes through tubes 7 and 8 into testing cell 9 and thence out through exhaust tube 10. The gas is thus circulated by pump 11 which is operated by means of an electric motor. Testing cell 9 is made of metal or other opaque material and is provided at each end with a quartz window 12. A micrometer screw 13 is fitted in the top of cell 9 so that when the screw is turned the lower end thereof is raised or lowered in the inside of the cell. The top face of the micrometer screw 13 is provided with graduations and vertical scale 14 cooperates with the graduations on the screw head to accurately measure the distance the screw is raised or lowered when turned. At one end of cell 9 and opposite one of the windows is situated a low pressure mercury vapor lamp 15. At the opposite end is located a photo-sensitive electronic device 16, for example, a sodium phototube. A similar photosensitive electronic device is located directly below lamp 15. The phototube 17 is shielded from the light from the lamp 15 by means not shown, the shielding means being provided with adjustable slit 18 which may be adjusted to permit a desired amount of light from lamp 15 to come into contact with phototube 17.

Mercury vapor lamp 15 is operated by means of an alternating current supply, for example a 60 cycle current of 100-125 volts. Between the current supply and the lamp circuit is provided a constant voltage transformer 19 designed to supply constant voltage to the lamp circuit regardless of fluctuations which may occur in the voltage of the supply current. The leads from the secondary of the transformer 19 are connected to opposite corners of a "monocyclic square" resonant circuit 20. Circuit 20 is composed of 2 condensers and 2 inductance coils. The two condensers 21 and two inductance coils 22 are all connected in series with each other. These inductance coils and condensers are of such character that they are of equal reactance at the frequency of the alternating current supply. In other words circuit 20 is tuned to resonant at the frequency of the alternating current supply. The mercury vapor lamp 15 is connected to the resonant circuit 20 at points 23 and 24. Resonant circuit 20 supplies substantially constant current to lamp 15.

The photo-electric cells 16 and 17 are connected in series, anode to cathode, and are also connected in series with a variable resistance 25. The phototubes operate on a dry cell battery, for example, one delivering 45 volts which is connected across the circuit between phototubes 16 and 17 on one side and the variable resistance 25 on the other side. Slider 26 of variable resistance 25 is grounded. From a point in the line between the phototubes 16 and 17 a connection extends to the grid of electrometer tube 27. This line also is connected to grounding switch 28. The cathode of the electrometer 27 is provided with a bias circuit comprising in series a battery 29 and variable resistance 30 having grounded slider 51. The plate circuit of the electrometer tube 27 includes in series ammeter 31 and battery 32. Batteries 29 and 32 may each have the same voltage, for example 22.5 volts.

In operating the device illustrated by the drawing and described above, for example, to measure the concentration of trichlorethylene vapor in air, the apparatus is connected to a source of A. C. current supply, for example a 60 cycle, 110 volt A. C. current. After a suitable period to permit the tubes to warm up, for example 10 to 15 minutes, the variable resistance 30 in the bias circuit is adjusted to bring the needle of ammeter 31 to an arbitrary reference point on the dial, for example to the mid-point of the dial. Valve 2 is then turned so as to cause the air being tested to be passed through absorption tube 3, thence through filter 4a, through pipes 7 and 8 and thence through cell 9. The pump is operated to thus circulate the air through cell 9. As the air passes through absorption tube 3 any trichlorethylene vapor is there removed. The filter 4a removes any dust particles which may be present in the air. It is important that such dust particles be removed because their presence will affect the results of the determination and the amount of dust in the air is subject to large variations within the sensitivity of the instrument over short periods of time. Micrometer screw 13 is screwed down to some predetermined reference point at which the portion of the screw inside cell 9 casts a shadow on photo-electric cell 16. That is, the micrometer screw is adjusted so as to intercept a fractional part of the light which comes from lamp 15 to tube 16. For example, the micrometer screw may be screwed down to the lowest position at this point in the operation. Then, while the trichlorethylene-free air is passing through cell 9, the slider 26 of variable resistance 25 is adjusted, if necessary, so as to bring the pointer of ammeter 31 back to the aforesaid reference point, for example, the mid point of the dial. Valve 2 then is turned so as to pass the incoming air directly into filter 4a, by-passing the absorption tube 3. Air contaminated with trichlorethylene vapor thus is pumped through cell 9.

In testing for the trichlorethylene vapor I may use a mercury vapor lamp which produces an ultra-violet light which is mainly of the same wave length as a major portion of the absorption spectrum of trichlorethylene. For example, I may use a lamp which produces a light the major portion of which has a wave length of around 2500 to 2600 Angstrom units. The phototubes 15 and 16 are selected to respond to the principal wave lengths emitted by the lamp. I prefer to use sodium phototubes since these are relatively inexpensive, readily available and have a satisfactory response in the wave length range corresponding to the absorption spectrum of trichlorethylene.

Since the trichlorethylene is partly opaque to the light from lamp 15, the presence of any trichlorethylene vapor in the air passing through cell 9 will decrease the amount of light passing to phototube 16. However, the amount of light passing to phototube 17 through the adjustable slit 18 will be unchanged. The difference in the amount of light falling on the two phototubes unbalances the electrical circuit and causes an unequal voltage drop across the two phototubes. The difference in the amount of voltage across phototubes 16 and 17 is measured by the electrometer circuit and is shown by deflection of the pointer of ammeter 31 from the reference point where it was originally set.

If desired, the amount of trichlorethylene vapor in the air may be determined from the ammeter reading at this point. That is the concentration of trichlorethylene vapor in the air in cell 9 may be calculated from the ammeter reading or the ammeter may be calibrated so that the trichlorethylene concentration can be read off directly. However, the ammeter reading generally is not satisfactory for determining the concentration or for detection of small traces of trichlorethylene or other vapors in air. The ammeter scale is small and restricted to an arc of not more than 90° and therefore it is difficult to accurately calibrate it for small differences of vapor concentration. Also, the extent of the ammeter pointer deflection sometimes varies because of electrical disturbances. Further, since the ammeter records the relative amount of light falling on the phototubes, its readings will vary with the intensity of the light from the lamp. Since the light intensity will generally change with the age of the lamp, reliance on ammeter readings will depend on frequent calibrations. On the other hand, the micrometer screw readings will remain constant regardless of variation in light intensity because the screw readings measure the fractional part of the light absorbed, and not the amount of light absorbed, in this double phototube system.

I prefer, therefore, at this point to turn the micrometer screw 13 so as to elevate it and thereby increase the amount of light passing to tube 16 until the amount of light striking tube 16 is such that the current outputs of tubes 16 and 17 again are equal. When that point of equality is reached, the pointer of the ammeter will return to the aforesaid reference point on the dial. The amount of trichlorethylene in the air in cell 9 then may be determined from the height to which the micrometer screw was raised as read from the micrometer scale on the head of the screw and on scale 14. By this means I am able to accurately determine, with reproduceable results, an amount of trichlorethylene vapor as small as about 10 parts per million in air.

Using the above described apparatus with the same mercury vapor lamp having a wave length of 2500 to 2600 Angstrom units and photo-electric tubes responsive to a similar range of wave lengths, I have been able to detect and determine accurately within ½–20 parts per million the concentrations of the presence of the following vapors in air: perchlorethylene, toluol, benzol, hydrogen sulfide, acetone and carbon disulfide.

The sensitivity of the device is in large measure due to the utilization of the micrometer screw 13 to accurately measure the amount of light absorbed by the substance tested. This element of the apparatus makes it possible to measure the vapor concentration with a high degree of accuracy, within the photosensitive limits of the apparatus. Obviously, my invention is not restricted to the herein described simple screw for this purpose. Various mechanical equivalents will be apparent to those skilled in the design of optical or other measuring instruments. It is only necessary to have in the testing cell some means for intercepting light to the phototube, means for varying the amount of light intercepted and means for accurately measuring the mechanical movement or displacement of the light intercepting means. Thus a curtain, adjustable slit or iris, a sliding rod or other device may be used in place of the screw shank in the testing cell. Such light intercepting means may be moved by or connected to a calibrated micrometer screw or other accurately scaled measuring device to measure the change in area of light interception; or the displacement of the light intercepting means may be measured by means of a micro-caliper or other suitable measuring device applied to a movable part connected to the light intercepting means. Further, although preferable, it is not essential, to locate the light intercepting device within the testing cell, such as cell 9. For example, the light intercepting device may consist of an adjustable slit, iris, or curtain located between the light source and the testing cell.

The high sensitivity of my device and its adaptability to accurately determine very low vapor concentrations also are enhanced by the use of the resonant circuit, such as circuit 20 in the drawings, which controls the current to the lamp. By means of this resonant circuit the current fed to the lamp is maintained at a substantially constant amperage, regardless of resistance changes in the lamp itself. Without such current control, the lamp current and consequently the resulting light, would vary with every change of resistance in the mercury arc or other light emitting means in the electric lamp utilized. Such light variation would be harmless in a system of two phototubes such as that described above, providing the two phototubes were absolutely identical in all respects. However, it is practically impossible to make two phototubes having such requisite close identity. Therefore it is essential for fine measurement to provide a light which is substantially unvarying in intensity and character of radiation. This can be done by providing a substantially constant current to the electric lamp used as light source.

While I prefer to use a pair of photosensitive devices, as illustrated by the apparatus shown in the appended drawings and described above, my invention also may be carried out with a single photosensitive device. For example, I may locate a single photoelectric tube opposite a lamp, with a cell similar to cell 9 of the drawings between. The photoelectric tube circuit then may be connected with a suitable electrometer tube circuit in conventional manner, with an ammeter in the plate circuit of the electrometer tube. Such a circuit is illustrated in Figure 2, this circuit being identical with the phototube circuit of Figure 1 with the exception that one phototube 17 is replaced by a resistance 52.

My invention or the above described modification thereof is not restricted to testing the particular substances above mentioned. Using the same mercury lamp emitting light of 2500-2600 Angstrom units and phototubes responsive thereto, I may test for the presence of vapor of any substance having appreciable opacity within that wave length range. The adaptability of the apparatus for testing any given material then readily may be apparent if the absorption spectrum of that material is known. Such absorption spectrum readily can be determined by known means, if not already known.

To test for the presence of substances having absorption spectra outside of the above mentioned range of light wave lengths, it is only necessary to select a light source which will emit light of the wave length corresponding to the absorption spectrum of the material to be tested and utilize photo-electric tubes responsive to that wave length. Thus the device is not restricted to the utilization of wave lengths in the ultra-violet portion of the spectrum but likewise it may be used throughout the visible range and into the range of infra-red light. Various types of electric lamps adapted to emit light of different wave length ranges are available and may be used for this purpose. Likewise, various types of photo-sensitive electrical devices are known which are responsive to various wave lengths through the entire spectrum. For example, the caesium oxide phototube is adaptable for use for the longer wave lengths in the ultra-violet range, through the visible range and into the infra-red. Further my invention is not restricted to the utilization of electronic photosensitive electrical devices but I may utilize in place of phototubes any device which is sensitive to photo-electric effects, for example, photovoltaic cells and photoconductive cells.

While my invention is especially well adapted to the detection of small traces of vapors in air or other gaseous mixtures, it also may be used to determine the concentrations of components of gas mixtures when high concentrations occur. The present invention affords a means of determining such high concentrations with a high degree of accuracy.

I claim:

1. An apparatus for determining the concentration of a constituent of a gas mixture which comprises a gas receiving cell adapted to be traversed by a beam of light, a pair of phototubes, a light source for directing a first beam of light onto one of said phototubes and a second beam of light through said cell thence onto the other of said phototubes, purifying means for selectively removing said constituent from said gas mixture, means for passing said gas mixture directly into said cell and for alternately passing said gas mixture through said purifying means and thence into said cell, and electrical measuring means associated with said phototubes adapted to measure the difference in the amount of light passing to the two phototubes.

2. An apparatus for determining the concentration of a constituent of a gas mixture which comprises a gas receiving cell adapted to be traversed by a beam of light, mechanical means for variably intercepting a fractional part of the light traversing said cell, a micrometer measuring device adapted to measure the degree of movement of said light intercepting means, a pair of phototubes, a light source for directing a first beam of light into one of said phototubes and a second beam of light through said cell thence onto the other of said phototubes, purifying means for selectively removing said constituent from said gas mixture, means for passing said gas mixture directly into said cell and for alternately passing said gas mixture through said purifying means and thence into said cell, and electrical measuring means associated with said phototubes adapted to measure the difference in the amount of light passing to the two phototubes.

3. An apparatus for determining the concentration of a constituent of a gas mixture which comprises a gas-receiving cell adapted to be traversed by a beam of light, a light source for supplying a beam of light to said cell, purifying means for selectively removing said constituent from said gas mixture, means for passing said gas mixture directly into said cell and for alternately passing said gas mixture through said purifying means and thence into said cell, and means for measuring the difference in the amount of light absorbed in said cell when containing unpurified gas and purified gas.

VICTOR F. HANSON.